(12) United States Patent
Clary et al.

(10) Patent No.: US 6,798,907 B1
(45) Date of Patent: Sep. 28, 2004

(54) SYSTEM, COMPUTER SOFTWARE PRODUCT AND METHOD FOR TRANSMITTING AND PROCESSING HANDWRITTEN DATA

(75) Inventors: Gregory J. Clary, Apex, NC (US); Roger L. Booth, Apex, NC (US); Christopher M. DiPierro, Durham, NC (US); Peter F. Hebert, Jr., Durham, NC (US); Jason S. Priebe, Raleigh, NC (US); Joseph S. Tate, Durham, NC (US)

(73) Assignee: Advanced Digital Systems, Inc., Durham, NC (US)

( * ) Notice: Subject to any disclaimer, the term of this patent is extended or adjusted under 35 U.S.C. 154(b) by 626 days.

(21) Appl. No.: 09/769,115

(22) Filed: Jan. 24, 2001

(51) Int. Cl.[7] .............................. G06K 9/00; G06K 9/36; G06F 15/00
(52) U.S. Cl. ........................ 382/187; 382/284; 707/515
(58) Field of Search .................................. 382/178, 179, 382/181, 186, 187, 284, 264, 305, 306; 707/500, 515, 516, 517, 526, 530, 541; 715/517, 526, 530, 531, 537, 501.1, 541; 709/206; 358/1.15, 402

(56) References Cited

U.S. PATENT DOCUMENTS

| | | |
|---|---|---|
| 4,793,810 A | 12/1988 | Beasley, Jr. |
| D308,364 S | 6/1990 | Beasley, Jr. et al. |
| 5,113,041 A | 5/1992 | Blonder et al. |
| RE34,476 E | 12/1993 | Norwood |
| 5,287,417 A | 2/1994 | Eller et al. |

(List continued on next page.)

OTHER PUBLICATIONS

WEBSITE: Ecrio, Inc.; *Welcome to ecrio.com, Ecrio, Inc.* (visited Dec. 21, 2000) <http://www.ecrio.com>, 10 total selected pages.

WEBSITE: Ecrio, Inc., *Ecrio White Paper* (visited Dec. 21, 2000) <http://www.ecrio.com/products/p_htm>, 10 total pages.

(List continued on next page.)

*Primary Examiner*—Andrew W. Johns
*Assistant Examiner*—Amir Alavi
(74) *Attorney, Agent, or Firm*—Alston & Bird LLP

(57) ABSTRACT

A system, computer program product and method are provided that smooth handwritten information following the transmission of handwritten data to a second computing device, thereby reducing the memory, processing and communications bandwidth requirements of a first computing device that captured the handwritten information. A system, computer program product and method are also provided for creating new points in the vicinity of at least some of the data points of the handwritten data after transmission of the data, thereby effectively improving the resolution of the handwritten information without increasing the memory, processing and communications bandwidth requirements of the first computing device. A system, computer program product and method are further provided that associate additional data with the handwritten information after the information has been transmitted such that a composite can be created without increasing the memory, processing and communications bandwidth requirements of the first computing device.

32 Claims, 5 Drawing Sheets

U.S. PATENT DOCUMENTS

| | | | |
|---|---|---|---|
| 5,347,477 | A | 9/1994 | Lee |
| 5,392,390 | A | 2/1995 | Crozier |
| 5,465,325 | A | 11/1995 | Capps et al. |
| 5,544,295 | A | 8/1996 | Capps |
| 5,577,135 | A | 11/1996 | Grajski et al. |
| 5,583,543 | A | 12/1996 | Takahashi et al. |
| 5,596,694 | A | 1/1997 | Capps |
| 5,625,833 | A | 4/1997 | Levine et al. |
| 5,629,499 | A | 5/1997 | Flickinger et al. |
| 5,666,530 | A | 9/1997 | Clark et al. |
| 5,680,636 | A | 10/1997 | Levine et al. |
| 5,682,439 | A | 10/1997 | Beernink et al. |
| 5,737,740 | A | 4/1998 | Henderson et al. |
| 5,787,312 | A | 7/1998 | Suzuki |
| 5,797,089 | A | 8/1998 | Nguyen |
| 5,818,425 | A | 10/1998 | Want et al. |
| 5,838,819 | A | 11/1998 | Ruedisueli et al. |
| 5,930,380 | A | 7/1999 | Kashi et al. |
| 6,018,591 | A | 1/2000 | Hull et al. |
| 6,153,836 | A | 11/2000 | Goszyk |
| 6,304,898 | B1 * | 10/2001 | Shiigi ......................... 709/206 |
| 6,424,426 | B1 * | 7/2002 | Henry ....................... 358/1.15 |
| 6,445,468 | B1 * | 9/2002 | Tsai ........................... 358/402 |
| 6,564,249 | B2 * | 5/2003 | Shiigi ......................... 709/206 |
| 6,678,864 | B1 * | 1/2004 | Tsai ......................... 715/501.1 |

OTHER PUBLICATIONS

WEBSITE: Ecritek Corp., *About Ecritek Corporation* (visited Jun. 26, 2000) <http://www.ecritek.com/company/company.html>, 54 total pages.

WEBSITE: Anoto AB, *Anoto—join the revolution* (visited Dec. 21, 2000) <http://www.anoto.com>, 29 total selected pages.

WEBSITE: Anoto, AB, *Anoton—Home* (visited Jul. 26, 2000) <http://www.anoto.com/main.asp>, 16 total pages.

Anoto, AB, *A comparison of Anoto Technology with Other Relevant Systems*, available at (visited Dec. 21, 2000) <http://www.anoto.com/pressroom/bin/comparison.pdf>, 17 total pages.

Anoto, AB, *Technical Brochure*, available at (visited Dec. 21, 2000) <http://www.anoto.com/pressroom/bin/technical_brochure.pdf>, 16 total pages.

Anoto, AB, *Anoto Pen*, available at (visited Dec. 21, 2000) <http://www.anoto.com/pressroom/bin/anoto_pen.pdf>, 16 total pages.

Anoto, AB, *Applications Illustrations*, available at (visited Dec. 21, 2000) <http://www.anoto.com.pressroom/bin/Applications_illus.pdf>, 1 total page.

WEBSITE: Seiko Instruments USA Inc., *Seiko Instruments—Business and Home Office Products Division* (visited Dec. 21, 2000) <http://www.seikosmart.com>, 7 total pages.

WEBSITE: Electric Pocket Limited, *BugMe.net: Yellow Stickies for Your Palm OS Handheld!* (visited Dec. 21, 2000) <http://www.bugme.net>, 15 total selected pages.

Electric Pocket Limited, *BugMe! User Guide*, available at (last modified Feb. 13, 2001) <http://www.bugme.net/BugMe.pdf>, 7 total pages.

Electric Pocket Limited, *BugMe! Messenger User Guide*, available at (last modified Feb. 13, 2001) <http://www.bugme.net/BugMeMessenger.pdf>, 8 total pages.

Electric pocket Limited, *BugMe! For Palm OS* (acquired Dec. 21, 2000), 4 total pages.

* cited by examiner

SYSTEM, COMPUTER SOFTWARE PRODUCT AND METHOD FOR TRANSMITTING AND PROCESSING HANDWRITTEN DATA

FIELD OF THE INVENTION

The present invention relates generally to the processing of handwritten information and, more particularly, to systems, computer program products and methods for transmitting and processing handwritten data.

BACKGROUND OF THE INVENTION

A variety of devices have recently been developed to capture and process handwritten information. For example, devices have been developed to capture handwritten information and to convert the handwritten information into text utilizing various character recognition techniques. This text can then be further processed, transmitted or otherwise utilized in the same fashion as text that has been entered via a keyboard or the like. In addition, devices have been developed that capture handwritten information and thereafter maintain the handwritten information in handwritten form for subsequent transmission, display or the like. For example, the handwritten information may be a map, a diagram or other drawing, or a document that includes Asian language characters that are not easily entered using standard keyboards. As such, these devices generally maintain an image of the handwritten information for subsequent transmission or display.

The devices that capture handwritten information are computing devices such as a pen-enabled computing device. A pen-enabled computing device enables the user to input handwritten information with a writing stylus instead of a mouse or a keyboard. In this regard, a pen-enabled computing device includes a handwriting capture interface. The handwriting capture interface may be a touch-sensitive screen and an associated processor for determining the coordinates that have been contacted by a writing stylus. Alternatively, the handwriting capture interface may include an electronic writing tablet having an overlaid writing surface. The writing surface may include, for example, a blank sheet of paper or a preprinted form. By writing upon the writing surface by means of a writing stylus, the user generates a visible, or "written ink," copy of the handwritten information. The handwriting capture interface of this exemplary pen-enabled computing device also includes a processor for detecting movement of the writing stylus upon the electronic writing tablet, i.e., relative to the writing surface, in order to capture an "electronic" copy of the handwritten information. Depending upon the design of the handwriting capture interface, the writing stylus may be a conventional pen or pencil, and the stylus may have a radio transmitter, a camera, an ultrasound transducer, any of a variety of magnetic or electric field devices, or any combinations thereof.

As will be apparent, the pen-enabled computing device may be capable of producing both an electronic ink and a written ink copy of the handwritten information. Since the writing stylus is generally capable of providing a written ink copy of the handwritten information on the writing surface, the user is automatically provided with a hard copy, or visual feedback. It is understood, however, that a written ink copy of the handwritten information may not be provided in some instances, such as those instances in which the handwritten information is only captured and stored by the pen-enabled computing device as an electronic copy.

Typically, a pen-enabled computing device senses the position and/or movement of the writing stylus with respect to the electronic writing tablet. Coordinates, such as the X and Y coordinates, representative of the position of the writing stylus at different points in time are stored by the pen-enabled computing device as the electronic copy of the handwritten data. The handwritten data is then often used for other purposes, such as by being incorporated into documents or being displayed. In order for the handwritten data to be subsequently utilized, it is sometimes translated from the handwritten form to text form. While text translation schemes may facilitate practical uses for the handwritten data, they are often not able to accurately translate the handwritten information. In addition, translation routines may impose additional processing and storage requirements that may disadvantageously add to the size and cost of the pen-enabled computing device. Moreover, certain handwritten information, such as maps, diagrams or other drawings, and documents containing Asian language characters, is highly usable in image form. Thus, the demand for pen-enabled computing devices that are capable of utilizing handwritten information for subsequent purposes, such as processing, transmission or the like, without requiring the handwritten information to first be translated into text form is increasing.

In a number of applications, the handwritten information that is captured by a pen-enabled computing device is designed to be transmitted to another, remotely located computing device. For example, a user may wish to provide a friend or co-worker in another town with a hand-drawn map. In these applications, the pen-enabled computing device is therefore one component of a larger system or network which permits the handwritten information that has been captured by the pen-enabled computing device to be transmitted to another remote computing device. In this situation, the pen-enabled computing device can include a transmitter for transmitting the handwritten data to a server, either via the Internet, wirelessly or according to some other transmission medium. The server then further distributes the handwritten data to the remote computing device, also via the Internet, wirelessly or according to some other transmission medium. The recipient can then display or otherwise process the handwritten data that has been received by the remote computing device.

Systems that include pen-enabled computing devices are desirably designed such that the resulting image of the handwritten information that is displayed for the recipient by the remote computing device accurately reflects the original handwritten information that was entered by the user and does so in a manner that is aesthetically pleasing. As such, the processor of some conventional pen-enabled computing devices smoothes the handwritten information prior to transmission of the handwritten information. As such, the image of the handwritten information that is eventually displayed to the recipient will appear to be less jagged and will appear to more accurately represent the handwritten information originally entered by the user. In order to smooth the handwritten information, the processor initially captures a plurality of coordinates representative of the position of the writing stylus relative to the electronic writing table at different instances in time, thereby defining one or more writing strokes. In order to display the handwritten information, the coordinate data is rendered into an image by utilizing line-drawing techniques known to those skilled in the art. The resulting image can be smoothed, such as by applying antialiasing techniques known to those skilled in the art. In this regard, antialiasing techniques adjust the gray-scale values of the pixels of the image in the vicinity of the lines such that the resulting lines appear to be smoother and have fewer sharp edges or corners. By way of example, the gray-scale values of the pixels along a line perpendicular to the line constructed by the line-drawing techniques can be modified to create a relatively smoothly shaped profile, as opposed to the relatively rectangular profile otherwise created by the line-drawing techniques. By repeating this process at each of a plurality of points along the line constructed by the line-drawing techniques, the image of the handwritten information can be smoothed.

Sometimes, the resolution of the handwritten information will also need to be changed from the resolution at which the handwritten information was captured to a new resolution at which an image of the handwritten information will be subsequently displayed. In instances in which it would be desirable to increase the resolution of the handwritten information, such as in instances in which the image of the handwritten information will be displayed in an enlarged manner by the remote computing device, a pen-enabled computing device may further process the handwritten information prior to its transmission to the remote computing device such that the resulting image of the handwritten information displayed by the remote computing device has a resolution that equals or exceeds the resolution at which the handwritten information was originally captured. In order to improve the resolution of the handwritten information, the processor of the pen-enabled computing device can create new points in the vicinity of the coordinates that define the handwritten information. For example, the processor can create new points in the vicinity of adjacent coordinates by means of known interpolation, approximation or curve-fitting techniques, such as cubic polynomial interpolation, approximation or curve-fitting, in order to effectively create additional coordinates near each original pair of adjacent coordinates. The image of the handwritten information provided to the remote computing device is therefore based not only upon the original coordinates captured by the handwriting capture interface, but also upon the additional coordinates created by interpolation, approximation or curve-fitting. As such, the resolution of the resulting image is effectively enhanced.

As will be apparent, the smoothing of the handwritten information and the creation of new points in the vicinity of the adjacent coordinates in order to improve the resolution of the handwritten information each impose substantial processing, memory and communications bandwidth requirements, thereby disadvantageously increasing the cost and decreasing the efficiency of the pen-enabled computing device and communications channel. The imposition of additional memory, processing and communications bandwidth requirements is especially disadvantageous for pen-enabled computing devices, however, since many pen-enabled computing devices are hand-held devices, such as personal digital assistants (PDAs), personal communications systems (PCSs), or other hand-held computing devices, which are designed to be as small, lightweight, and generally inexpensive as practical. Moreover, if the processor and/or memory of the pen-enabled computing device are undersized, smoothing of the handwritten data and creation of new points in the vicinity of adjacent coordinates may require inordinately long periods of time, thereby somewhat restricting use of the penenabled computing device. Additionally, the user of the pen-enabled computing device may be unable to anticipate the manner in which the remote computing device will display or otherwise utilize the handwritten information, thereby preventing the handwritten information from being effectively smoothed or the resolution of the handwritten information from being appropriately adjusted prior to transmission to the remote computing device.

With the proliferation of e-mail, instant messaging, and other electronic communication techniques, a variety of different types of information are routinely transmitted between parties. For example, information such as text, pictures, drawings, links to web sites and the like, is routinely transmitted from one party to another. In order to transmit both the handwritten as well as the additional information to a remote computing device, either in a single message or in separate messages, the memory, processing and communications bandwidth requirements of the pen-enabled computing device are further disadvantageously increased. Moreover, if the additional information relates to or is otherwise associated with the handwritten information and is transmitted in another message, the recipient must appropriately associate or relate the handwritten information and the additional information that are delivered via separate messages. While a variety of conventional pen-enabled computing devices are available for capturing and processing handwritten information, it would be desirable for the images of the handwritten information that are eventually displayed to be smoothed and to have improved resolution without unnecessarily increasing the processing, memory and communications bandwidth requirements and, accordingly, the cost of the pen-enabled computing devices. Similarly, it would be desirable for a pen-enabled computing device to be capable of transmitting messages that include both handwritten information and some additional information without unnecessarily increasing the processing, memory and communications bandwidth requirements of the pen-enabled computing device.

SUMMARY OF THE INVENTION

The present invention therefore provides improved systems, computer program products and methods for transmitting and processing handwritten data in a manner that offers increased functionality by reducing the processing, memory and communications bandwidth requirements of the first computing device that captures the handwritten information. According to one aspect of the present invention, a system, computer program product and method are provided that smooth the handwritten information following the transmission of the handwritten data to a second computing device, thereby reducing the memory, processing, and communications bandwidth requirements of the first computing device. Similarly, according to another aspect of the present invention, a system, computer program product and method are provided for creating new points in the vicinity of at least some of the data points that comprise the handwritten information following the transmission of the handwritten data to a second computing device, thereby improving the resolution of the handwritten information without increasing the memory, processing and communications bandwidth requirements of the first computing device. According to yet another aspect of the present invention, a system, computer program product and method are provided that associate additional data with the handwritten information after the handwritten information has been transmitted from the first computing device that captured the handwritten information to a second computing device and which thereafter creates a composite comprised of both the handwritten information and the additional data, thereby reducing the processing, memory and communications bandwidth requirements of the first computing device and eliminating any need for the recipient to compile separate messages containing the handwritten information and any additional data.

According to one aspect of the present invention, a system, computer program product and method are provided for transmitting and processing handwritten data that smoothes the handwritten information following the transmission of the handwritten data from the first computing device that captured the handwritten information to a second computing device. According to this aspect of the present invention, the first computing device captures the handwritten information and subsequently transmits handwritten data representative of the handwritten information. Typically, the handwritten information is comprised of a plurality of data points. As such, the first computing device transmits handwritten data representative of the plurality of data points that comprise the handwritten information. According to this aspect of the present invention, a second computing device receives the handwritten data transmitted by the first computing device. The second computing device includes a processing element for rendering the handwritten information based upon the handwritten data. For example, the processing element can initially recover the handwritten information including the plurality of data points based upon the handwritten data that has been received. The processing element can then draw lines according to the plurality of data points in order to render the handwritten information.

Advantageously, the processing element of the second computing device of this aspect of the present invention is adapted to smooth the handwritten information while rendering the handwritten information following the transmission of the handwritten data to the second computing device. For example, the processing element can smooth the handwritten information by drawing smooth lines drawn according to the plurality of data points. In one common example, the processing element smoothes the handwritten information by applying an antialiasing algorithm to the handwritten information. The processing element can also be adapted to create a message that incorporates the smoothed handwritten information. The message may be an e-mail message, a facsimile message, an instant message or the like. In addition to or instead of transmitting a message including the smoothed handwritten information, the second computing device can include a memory device for storing the smoothed handwritten information.

In addition to a system including the first and second computing devices, a method and an associated computing program product for transmitting and processing handwritten data that includes smoothing the handwritten information following the transmission of the handwritten data to the second computing device are also similarly provided according to this aspect of the present invention. By smoothing the handwritten information, the aesthetic appearance of the handwritten information stored by the second computing device or embodied in a message created by the second computing device is improved. By smoothing the handwritten data at the second computing device following the transmission of the handwritten data, however, the system, the computer program product and the method of this aspect of the present invention reduce the memory, processing and communications bandwidth requirements of the first computing device that captured the handwritten information since the first computing device no longer is required to smooth the handwritten information.

According to another aspect of the present invention, a system, computer program product and method are provided for transmitting and processing handwritten data in which the resolution of the handwritten information is improved by creating new points based upon respective positions of at least some of the plurality of data points that comprise the handwritten information following the transmission of the handwritten data from the first computing device that captured the handwritten information to a second computing device. According to this aspect, the first computing device captures handwritten information comprised of a plurality of data points and transmits handwritten data representative of the handwritten information to a second computing device. The second computing device receives the handwritten data. The second computing device includes a processing element for rendering the handwritten information based upon the handwritten data. For example, the processing element initially recovers the handwritten information including the plurality of data points represented by the handwritten data prior to rendering the handwritten information. According to this aspect of the present invention, the processing element is adapted to create new points based upon respective positions of at least some of the plurality of data points, such as by means of cubic polynomial interpolation, approximation or curve-fitting, in order to better render the handwritten information following the transmission of the handwritten data to the second computing device. As such, the processing element can then render the handwritten information by drawing lines between the plurality of data points or the newly created points or both sets of points. After creating the new points to effectively improve resolution, the processing element can create a message that incorporates the handwritten information, such as an e-mail message, a facsimile message, an instant message or the like. In addition to or instead of transmitting a message including the handwritten information, the second computing device can include a memory device for storing the handwritten information following the creation of new points based upon respective positions of at least some of the plurality of data points.

In addition to a system that includes the first and second computing devices, a method and a corresponding computer program product for transmitting and processing handwritten data which creates new data points based upon respective positions of at least some of the plurality of data points of the handwritten information following the transmission of the handwritten data from the first computing device that captured the handwritten information to a second computing device are similarly provided according to this aspect of the present invention. By creating new points based upon respective positions of at least some of the data points, the resolution of the handwritten information stored by the second computing device or embodied in a message created by the second computing device is improved. By creating the new points at the second computing device following the transmission of the handwritten data, however, the system, the computer program product and the method of this aspect of the present invention reduce the memory, processing and communications bandwidth requirements of the first computing device that captured the handwritten information since the first computing device no longer is required to create new points based upon respective positions of at least some of the plurality of data points that comprise the handwritten information.

According to another aspect of the present invention, a system, a computer program product and a method are provided for transmitting and processing handwritten data that are capable of identifying additional data to be associated with handwritten information and that can create a composite comprised of both the handwritten information and the additional data. According to this aspect of the present invention, a first computing device captures the handwritten information and transmits handwritten data representative of the handwritten information. A second computing device receives the handwritten data transmitted by the first computing device. The second computing device includes a processing element for rendering the handwritten information based upon the handwritten data. Typically, the handwritten information is comprised of a plurality of data points such that the processing element initially recovers the handwritten information including the plurality of data points represented by the handwritten data and then draws smooth lines between the plurality of data points and/or the created points in order to render the handwritten information.

According to this aspect of the present invention, the processing element is also adapted to identify additional data to be associated with the handwritten information and to create a composite comprised of both the handwritten information and the additional data. Typically, instructions are provided regarding the additional data to be associated with the handwritten information such that the processing element can identify the additional data in accordance with the instructions. A variety of different types of data can be associated with the handwritten information such as pre-defined text, audio and/or video, a link to a web site, additional handwritten information, an image, a letterhead or the like. The handwritten information and the additional data can be processed in several manners. For example, the processing element may separately incorporate both the handwritten information and the additional data into a message in order to create the composite. Alternatively, the processing element may overlay either the handwritten information or the additional data upon the other one in order to create the composite. The processing element can then create a message such an e-mail message, a facsimile message, an instant message of the like, that incorporates the composite. In addition to or instead of creating a message that incorporates the composite, the second computing device can include a memory device for storing the handwritten information and the additional data.

In addition to the system for transmitting and processing handwritten data that identifies additional data to be associated with the handwritten information and that creates a composite including both the handwritten information and the additional data, a method and a corresponding computer program product are similarly provided. By identifying additional data to be associated with the handwritten information and creating a composite containing both the handwritten information and the additional data, the system, computer program product and method of this aspect of the present invention permit the memory, processing and communications bandwidth of the first computing device to be reduced. Additionally, the system, computer program product and method of this aspect of the present invention can provide both the handwritten information and the additional data to recipient in a convenient form without requiring the recipient to associate handwritten information and additional data that have been received via separate messages.

Accordingly, the systems, computer program products and methods of the present invention can provide improved functionality by smoothing the handwritten information, creating new points based upon respective positions of at least some of the data points that comprise the handwritten information in order to improve the resolution of the resulting image of the handwritten information and/or by associating additional data with the handwritten information and creating a composite containing both the handwritten information and the additional data according to various aspects of the present invention. By smoothing the handwritten information and creating the new points with the second computing device following the transmission of handwritten data representative of the handwritten information from the first computing device to the second computing device, the system, computer program product and method of these aspects of the present invention permit the memory, processing and communications bandwidth requirements of the first computing device to be reduced. Since the first computing device is oftentimes a handheld or portable computing device, reductions in the memory, processing and communications bandwidth requirements are particularly advantageous. For example, by smoothing the handwritten information and creating new points at the second computing device, the first computing device need not transmit as much handwritten data to the second computing device, thereby advantageously reducing the bandwidth required to transmit the handwritten data from the first computing device to the second computing device.

BRIEF DESCRIPTION OF THE DRAWINGS

Figure 1:
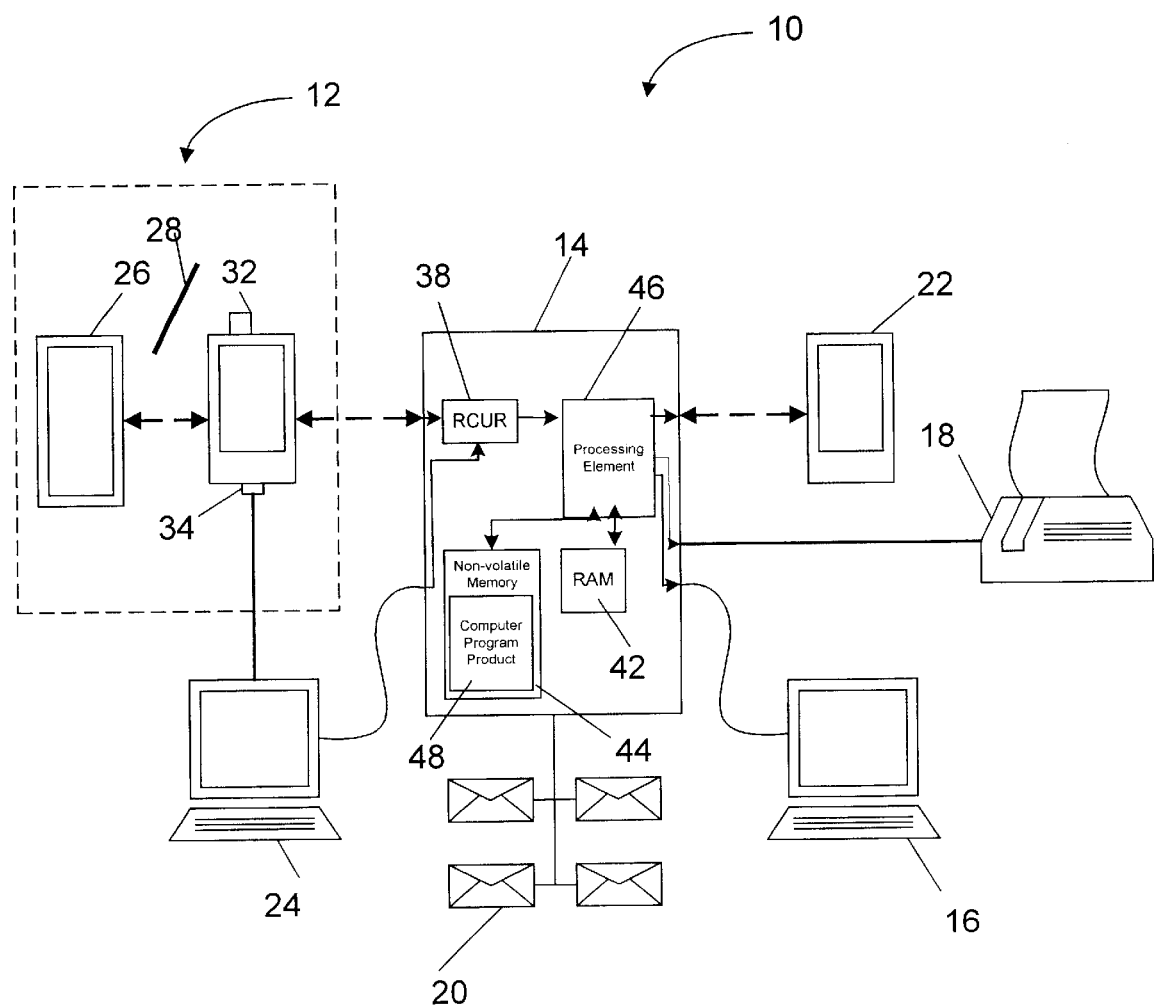
Figure 2:
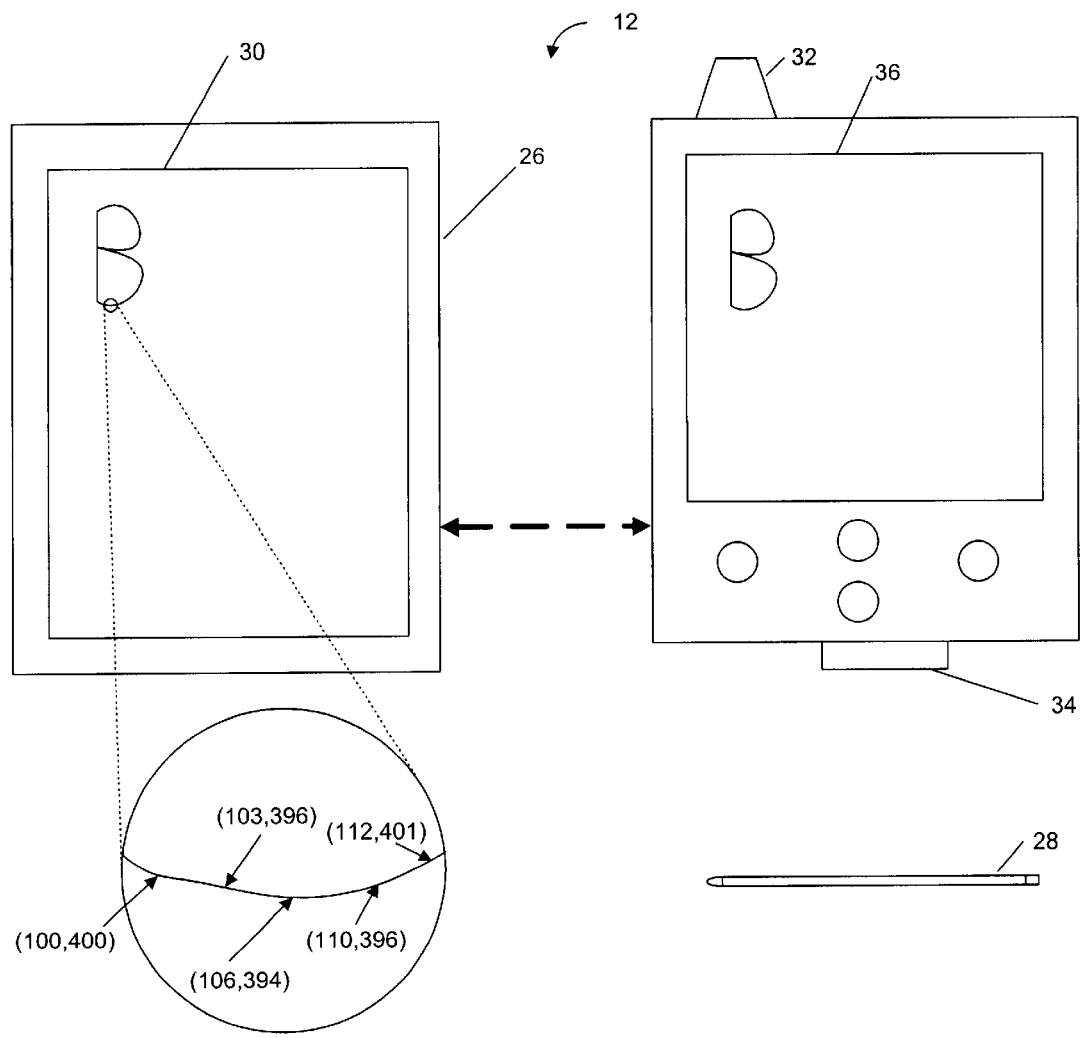
Figure 3A:
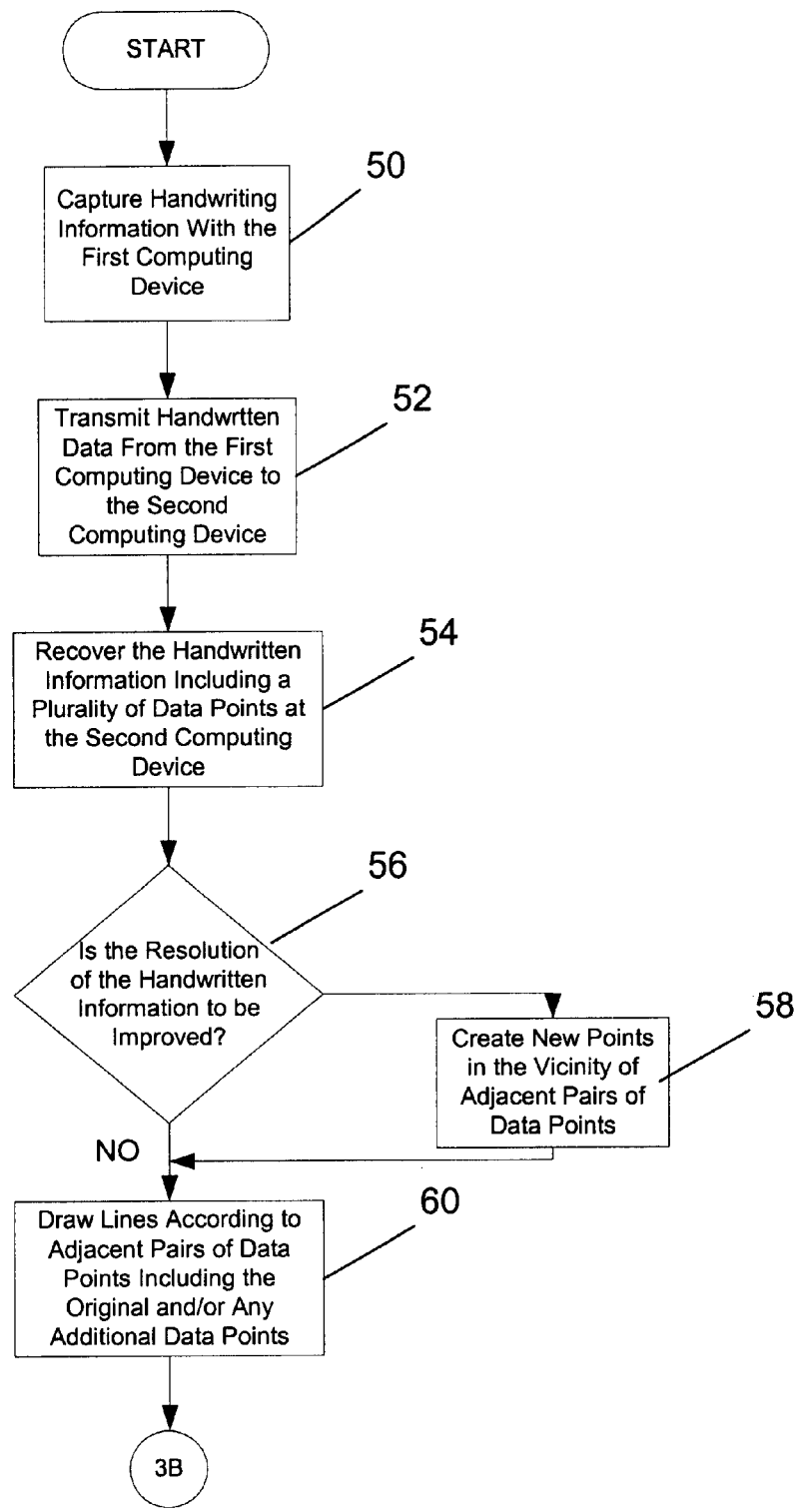
Figure 3B:
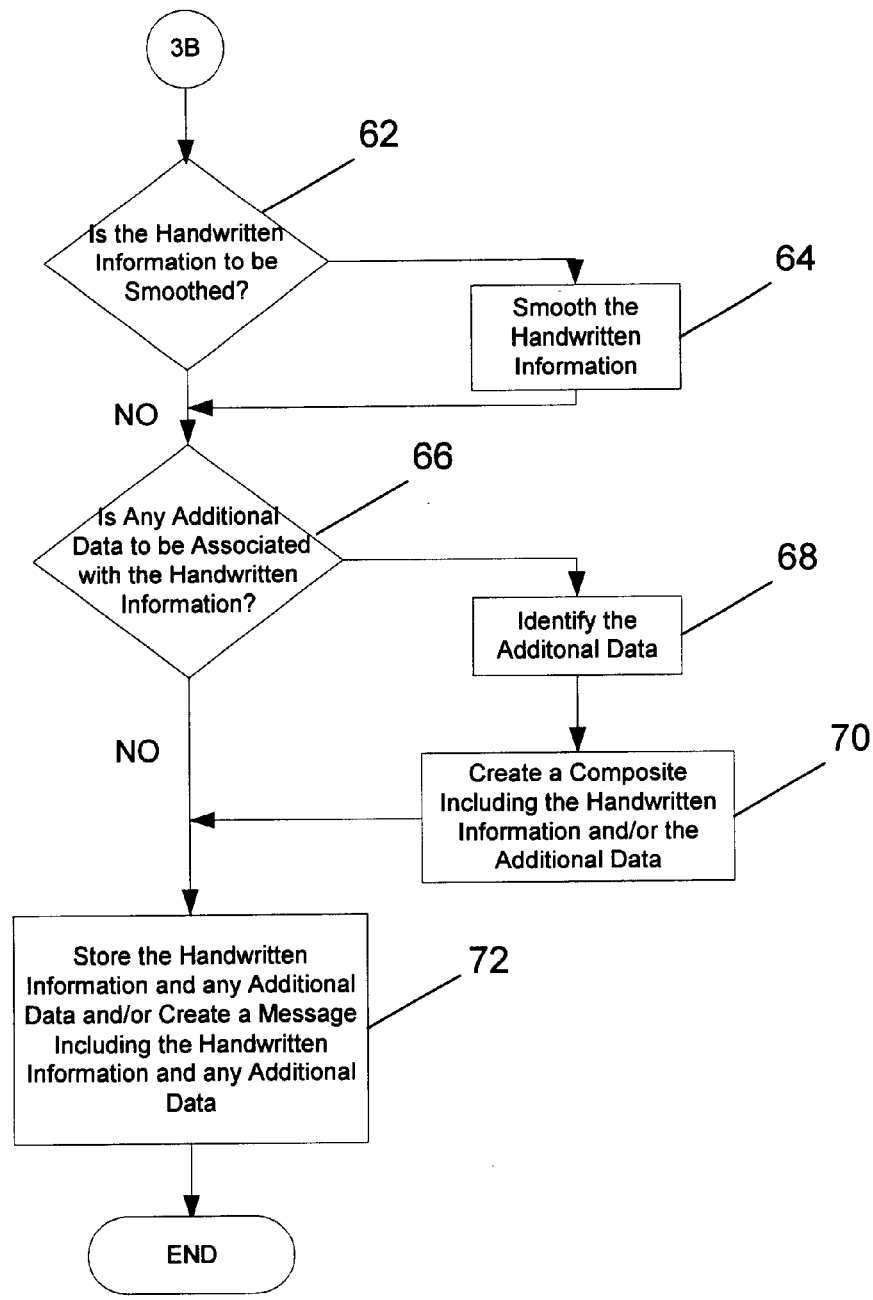
Figure 4:
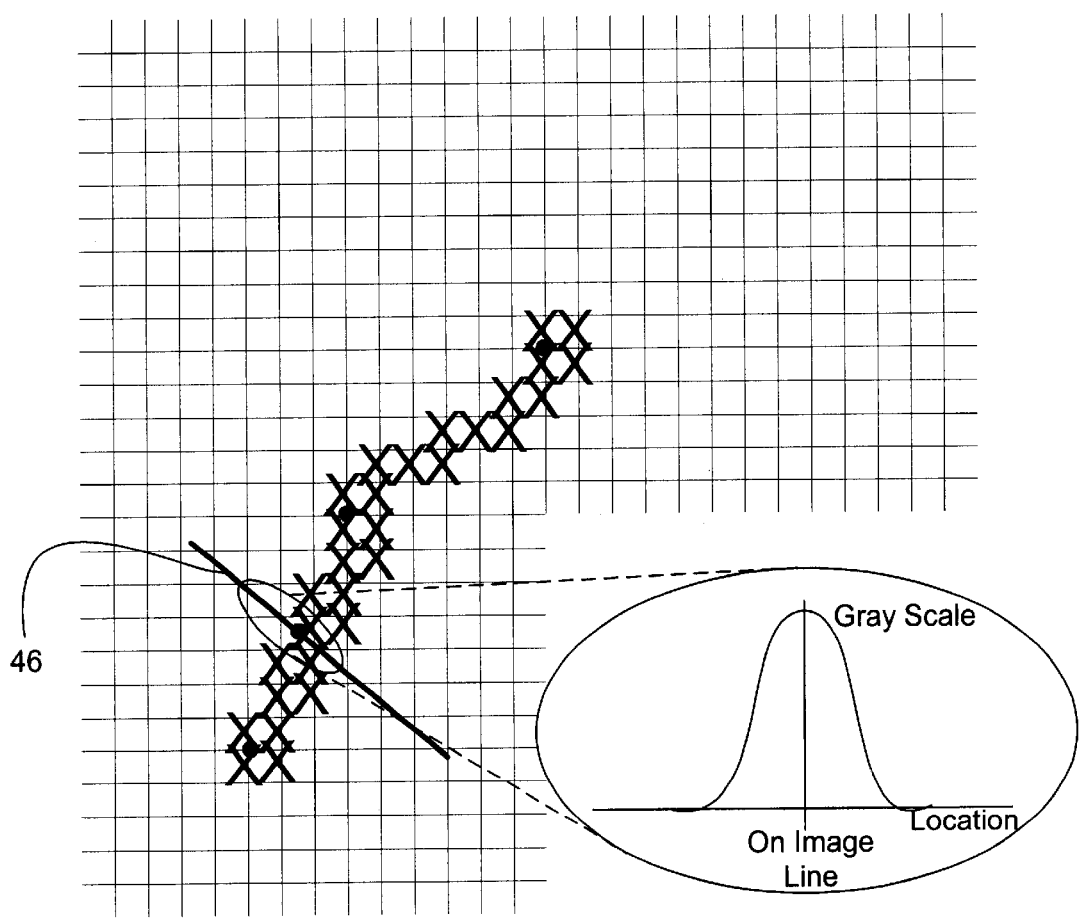

Having thus described the invention in general terms, reference will now be made to the accompanying drawings, which are not necessarily drawn to scale, and wherein:

FIG. 1 is a block diagram of a system according to one embodiment of the present invention;

FIG. 2 is a schematic representation of a pen-enabled computing device according to one embodiment of the present invention;

FIGS. 3A and 3B collectively define a flow chart illustrating the operations performed according to one advantageous embodiment of the present invention; and FIG. 4 is a representation of a portion of a writing stroke that illustrates the image cross-section extending perpendicular to the writing stroke after smoothing.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A schematic representation of a system 10 for transmitting and processing handwritten data according to one embodiment of the present invention is depicted in FIG. 1. As shown, the system includes first and second computing devices 12, 14 that are adapted to communicate with one another. The first computing device is typically a portable handheld computing device, such as a PDA, a PCS, a portable computer or other type of portable or handheld computing device. However, the first computing device can be a personal computer or any other type of stationary computing device so long as the first computing device is capable of capturing handwritten information and thereafter transmitting the handwritten information as described hereinbelow. The second computing device 14 is typically a server that is adapted to receive the handwritten data transmitted by the first computing device 12 and to thereafter process the handwritten data. However, the second computing device can be any of a variety of other types of computing devices, such as a mainframe computer, a personal computer, a workstation or the like, so long as the second computing device is capable of performing the functions described hereinbelow. Typically, the second computing device is adapted to further transmit messages that include the handwritten information originally captured by the first computing device. In this regard, the second computing device can transmit messages including the handwritten information to a variety of remote devices, such as a personal computer 16, a facsimile machine 18, an e-mail server 20, a PDA, a PCS or other computing device 22 having messaging capability, such that the intended recipient will receive and can view the message including the handwritten information.

The first and second computing devices 12, 14 and, in turn, the second computing device and the remote devices can communicate in a variety of different manners. For example, the first and second computing devices can communicate wirelessly, such as by means of a wireless local area network (LAN) or a wireless wide area network (WAN). Alternatively, the first and second computing devices can be connected via a conventional wired LAN or wired WAN or by any other wired connection. As will be apparent to those skilled in the art, the first and second computing devices may be configured to communicate directly or may communicate indirectly via one or more intermediate computing devices, such as the intermediate personal computer 24 depicted in FIG. 1. In addition to being capable of being interconnected in a variety of different manners, the first and second computing devices can communicate by any of a number of different communications protocols, although standard Internet communication protocols are typically preferred.

Similarly, the second computing device 14 is capable of communicating with the remote devices by any of a number of different manners, such as via wireless connections or wired connections as illustrated by the dashed and solid lines in FIG. 1, respectively. Similarly, the second computing device can communicate with the remote devices according to any of a variety of communications protocols, although standard Internet communications protocols are also preferred. Additionally, while the system 10 depicted in FIG. 1 illustrates a second computing device that communicates with a variety of remote devices, the system may be designed such that the first computing device 12 communicates directly with one or more remote devices such that the remote device itself is the second computing device.

Although the first computing device 12 can be embodied in many different manners, the first computing device is typically a pen-enabled computing device, one example of which is depicted in FIG. 2. The pen-enabled computing device has a handwriting capture interface 26 that is responsive to a writing stylus 28. The pen-enabled computing device can include a variety of handwriting capture interfaces. For example, the handwriting capture interface can include a touch sensitive screen capable of identifying those points on the screen with which the writing stylus comes into contact and for providing signals representative of the coordinates of the respective points on the screen. Alternatively, the first computing device can include an electronic handwriting tablet that cooperates with the writing stylus to determine the position of the writing stylus relative to the electronic handwriting tablet at a plurality of successive instances in time. In this regard, the writing stylus may include a radio transmitter, an ultrasound transceiver or the like for communicating with the electronic handwriting tablet. As such the electronic handwriting tablet of these embodiments would include a corresponding receiver for detecting the signals indicative of the position of the writing stylus. Alternatively, the writing stylus can be designed to identify its relative position by electric field or magnetic field means, by means of a camera or by any other means known to those skilled in the art. In addition to capturing a plurality of "electronic ink" data points defining the position of the writing stylus over time, a written record of the handwritten information may also be created. For example, a piece of paper 30 can be mounted upon the electronic handwriting tablet such that the writing stylus concurrently marks upon the piece of paper while communicating with the electronic handwriting tablet to create the plurality of "electronic ink" data points. Additionally, the writing stylus may be designed such that the writing stylus itself detects its relative position with respect to a piece of paper and then electronically communicates with the handwriting capture interface without employing a conventional electronic handwriting tablet. In these instances, the writing stylus may detect a faint dot pattern printed on the paper or sense the fibers of the paper in order to detect or determine its relative position with respect to the piece of paper. One system that includes a writing stylus that detects its position relative to a sheet of paper is contemplated by Anoto Inc. of Newton, Mass.

Regardless of the manner in which the handwriting capture interface 26 is embodied, the handwriting capture interface captures and provides a series of data points, typically represented by X, Y coordinate points, representative of the position of the writing stylus 28 at a plurality of successive instances in time. See, for example, the five coordinate points that define a lower segment of the character "B" in the exploded portion of FIG. 2. See also block 50 of FIG. 3A. The set of coordinate points from the time at which the writing stylus initiates contact with the touch sensitive screen, electronic handwriting tablet or paper to the time at which the writing stylus is lifted from the touch sensitive screen, electronic handwriting tablet or paper defines a writing stroke, a plurality of which typically define the handwritten information that has been entered by the user.

In addition to the handwriting capture interface 26 and the writing stylus 28, the first computing device 12 also includes a processor, such as a central processing unit, and associated memory, such as random access memory and a non-volatile storage device. As such, the plurality of coordinate points representative of the handwritten information can be stored and subsequently processed by the first computing device. In the illustrated embodiment, the handwriting capture interface is a discrete component from the remainder of the first computing device, and is adapted to communicate with the remainder of the first computing device via any conventional communications technique, including a wired connection, such as an RS232 connection, or a wireless connection, such as by means of a Bluetooth interface. In this regard, the pen-enabled computing device depicted in FIG. 2 includes an antenna 32 for supporting wireless communications and an external device interface 34 for supporting a traditional wired connection. However, the first computing device can be formed as a single component with the handwriting capture interface, the processor, the associated memory and any other elements assembled in a single package.

Prior to storing the handwritten information and prior to transmitting the handwritten information to the second computing device 14, the first computing device 12 preferably compresses the handwritten information. In his regard, one advantageous technique for compressing the handwritten information is described in U.S. patent application Ser. No. 09/768,949 entitled *System, Device, Computer Program Product and Method for Representing a Plurality of Electronic Ink Data Points* by Peter Hebert filed concurrently herewith, the contents of which are incorporated herein by reference. Preferably, the plurality of coordinate points that comprise the handwritten information are compressed by means of a lossless vector compression algorithm disclosed in the aforementioned patent application. In this regard, the processor of the first computing device can implement a lossless vector compression algorithm which retains the initial point of each writing stroke as well as the second derivative of all subsequent points, and which thereafter tokenizes and encodes the handwritten data, such as by Huffman encoding. As such, the processor can represent the points of the writing stroke in a lossless manner with a reduced number of bits, thereby permitting the handwritten information to be represented in a compressed manner. Alternatively, the processor of the first computing device can retain the first coordinate point of a writing stroke with all subsequent points being recorded only in terms of the changes in X and the changes in Y from the previous point. This type of compression is referred to as delta coding. Regardless of the compression technique, the first computing device and, more particularly, the processor may then store the compressed representation of the handwriten information in an associated memory device. Additionally, the first computing device can include a user interface including a display 36 for depicting the handwritten information that has been captured by the handwriting capture interface 26.

According to the present invention, the first computing device 12 is designed to transmit the handwritten data, representative of the handwritten information, to the second computing device 14. See block 52 of FIG. 3A. Accordingly, the first computing device is also adapted to permit the user to identify the intended recipient of the handwritten information. As such, the first computing device can also include a keypad, a keyboard, an automatic speech recognizer, a pop-up on-screen keyboard, means for interpreting stylus actions or the like for permitting the user to enter the name or other identifier of the recipient. As used herein, the recipient need not be one or more individuals, but may be a database on the second or other computing device. Alternatively, the recipient of the handwritten information can be identified by selecting the name or other identifier of the recipient from an address book maintained by the first computing device. Still further, the user can write the name or other identifier of the intended recipient upon the handwriting capture interface 26 and, by means of a character recognition technique, the processor can determine the intended recipient. The user of the first computing device can also identify the type of message to be delivered to the intended recipient, such as an e-mail message, a facsimile, an instant message, a grocery list, a to-do list, notes or the like. Alternatively, the first computing device, the second computing device or some other component of the system 10 may already include information specifying the recipient of the message such that the recipient of the message can be automatically determined based upon the type of the message. Similarly, the first computing device, the second computing device or some other component of the system may include information specifying the type of message to be transmitted based upon the intended recipient of the message.

Once an intended recipient is identified, the first computing device 12 transmits a compressed representation of the handwritten information. Prior to transmitting the compressed representation of the handwritten information, the first computing device and, in particular, the processor of the first computing device, preferably encrypts the compressed representation of the handwritten information. The first computing device can utilize a variety of different encryption techniques known to those skilled in the art. Once encrypted, the first computing device transmits the handwritten data, i.e., the encrypted, compressed representation of the handwritten information, to the second computing device. As such, the first computing device can include a transmitter for wirelessly transmitting the handwritten data to the second computing device, either directly or indirectly, via the antenna 32. Alternatively, the first computing device can include an external device interface 34 for transmitting the handwritten data via a wired connection, either directly to the second computing device or indirectly via one or more intermediate computing devices to the second computing device. Still further, the first computing device can include other types of transmitters as known to those skilled in the art if the handwritten data is to be transmitted in another manner.

The second computing device 14 is designed to receive the handwritten data transmitted by the first computing device 12. As also depicted in FIG. 1, the second computing device includes a receiver 38, such as an external device interface for receiving the handwritten data via a wired connection, typically a wired LAN or a wired WAN connection, from the first computing device, either directly or indirectly through one or more intermediate computing devices. Alternatively, the second computing device can include a wireless receiver for receiving a wireless transmission of the handwritten data from the first computing device. In addition to a-receiver, the second computing device includes a processing element 40, typically formed of a central processing unit, and associated memory devices, such as a random access memory device 42 and a nonvolatile storage device 44.

The processing element 40 initially decrypts and decodes, i.e., decompresses, the handwritten data, such as the Huffman encoded data, in a manner known to those skilled in the art. Thereafter, the processing element recovers the coordinate points that comprise the handwritten information transmitted by the first computing device 12. See block 54 of FIG. 3A. In this regard, depending upon the manner in which the handwritten information has been compressed, such as delta coding or by utilizing the second derivatives of the coordinate points, the processing element of the second computing device 14 can readily recover the handwritten information consisting of the plurality of coordinate points originally captured by the first computing device. The second computing device can then render the handwritten information consisting of a plurality of coordinate points into an image by utilizing line-drawing techniques known to those skilled in the art in order to connect adjacent pairs of coordinate points.

In order to improve the resolution of the handwritten information, the second computing device 14 and, in particular, the processing element 40, can create new points based upon respective positions of adjacent coordinate points by curve-fitting, interpolation or approximation. See blocks 56 and 58 of FIG. 3A. As a result of the curve-fitting, interpolation or approximation, the processing element effectively defines one or more additional coordinate: points in the vicinity of each original pair of adjacent coordinate points such that the resulting image of the handwritten information appears less jagged and has a better resolution.

While the processing element of the second computing device can utilize a variety of different interpolation, approximation or curve-fitting techniques, the processing element of one advantageous embodiment employs cubic polynomial approximation using Bezier curves, for example, to create new points based upon respective positions of at least some of the original pairs of coordinate points. See, for example, W. H. Press, et al., *Numerical Recipes in C, the Art of Scientific Computing*, University Press, Second Edition (1992) and James D. Foley, et al., *Computer Graphics: Principles and Practice in C*, Addison-Wesley, Second Edition (1996), the contents of which are incorporated by reference herein, for a further description of computer-implemented interpolation, approximation or curve-fitting techniques. The processing element can then render the handwritten information consisting of at least some of the original coordinate points captured by the first computing device 12 and the additional points added during the creation process by utilizing line-drawing techniques known to those skilled in the art to connect adjacent coordinate points. It should be understood, however, that the original coordinate points may or may not be included when connecting coordinate points. In one advantageous embodiment, only the original coordinate points corresponding to the end points of the strokes are connected (in generic cases) with the additional points generated from the approximation techniques as opposed to the other original points. Alternatively, Bezier curves may be rendered directly using techniques known to those skilled in the art. See block 60. The processing element of one embodiment thereby creates an image of the handwritten information. As a result of creating new points, the resolution of the image of the handwritten information is effectively improved. In one embodiment, for example, handwriting points captured by the handwriting capture interface 26 of the first computing device are captured at a lower resolution than the resolution of the image to be produced by the second computing device. The second computing device therefore creates the new data points based upon respective positions of at least some of the captured points before scaling the captured and created points to the to-be-produced image resolution, which allows for a smoother rendering of the points in the produced image.

In order to improve the resulting image of the handwritten information, regardless of whether or not the processing element 40 has improved the resolution of the handwritten information by creating new points in the vicinity of adjacent coordinate points, the processing element smoothes the handwritten information and, more particularly, smoothes the lines drawn according to adjacent coordinate points according to one aspect of the present invention. See blocks 62 and 64 of FIG. 3A. Although a variety of techniques can be utilized to smooth lines as known to those skilled in the art, the processing element of one embodiment applies an antialiasing algorithm to smooth the handwritten information. See, for example, Foley, et al., *Computer Graphics: Principles and Practice in C*, the contents of which are incorporated herein by reference, for a more complete description of computer-implemented smoothing techniques including antialiasing algorithms.

In those embodiments in which the processing element 40 renders the handwritten information by creating an image, the processing element smoothes the handwritten information by slightly adjusting the image of the handwritten information. As shown diagrammatically in FIG. 4, the image includes a plurality of pixels having respective gray-scale levels. In this regard, those pixels that have an "X" in FIG. 4 have grayscale levels that are different than the background and are generally arranged in lines between respective pairs of the coordinate points (designated by the large dots in FIG. 4). As such, the image defines the lines (hereinafter referred to as "image lines") between the adjacent pairs of coordinate points. In order to smooth the image lines, the processing element may analyze the image along a line 46 (hereinafter referred to as a "cross-section line") perpendicular to an image line at each of a plurality of points along the length of each respective image line. Absent smoothing, the gray-scale values of the pixels of the image along each cross-section line will have a relatively rectangular profile since the representation of the line abruptly changes from the white background to a black or very dark gray line, or vice versa. In order to smooth the image lines, the processing element alters the gray-scale values of the pixels along the cross-section line (including those pixels already having a gray-scale value different than the background and designated with an "X" and, in some instances, those pixels that previously formed part of the background and not designated with an "X") at each point along the image lines such that the profile of the gray-scale values of the pixels along each cross-section line defines a more smoothly shaped curve as depicted by the inset graph of gray-scale values versus location shown in FIG. 4. In one embodiment, a Sinc filter is applied at each pixel along the cross-section line. The new value for a pixel is the result of applying the Sinc filter to the original image centered at that pixel. By repeating this process at a plurality of points along the image lines, the handwritten information can be smoothed such that the resulting image of the handwritten information generated by the second computing device looks less jagged, more realistic and generally more aesthetically pleasing. While one technique for smoothing the handwritten information has been described above, other techniques can be employed, including line-drawing techniques that smooth the lines as they are drawn. One such technique that smoothes lines as they are drawn is the Gupta-Sproull scan-conversion algorithm for lines, which is described in Foley, et al., *Computer Graphics; Principles and Practice in C* 137–41.

By improving the resolution of the resulting image of the handwritten information and/or by smoothing the handwritten information with the processing element 40 of the second computing device 14, the system 10 and method of the present invention produce handwritten information that is more aesthetically pleasing as a result of having an improved resolution and/or having been smoothed without requiring the first computing device 12 to create new points based upon respective positions of at least some of the coordinate points or to smooth the handwritten information prior to transmitting the handwritten data. As such, the memory, processing and communications bandwidth requirements of the first computing device can be reduced relative to the memory, processing and communications bandwidth requirements that otherwise would be necessary to improve the resolution of the handwritten information by creating new points or to smooth the handwritten information. As such, the size, weight and/or cost of the first computing device may be reduced somewhat.

Since the second computing device 14 is frequently a server, such as an Intel-based personal computer server, creating the new points based upon respective positions of adjacent coordinate points and smoothing the handwritten information by the second computing device also takes advantage of the relatively large memory and processing capabilities of a server. In this regard, a conventional Intel-based personal computer server may include a processor that operates at 800 MHz and may include 256 Megabytes of memory in comparison to a Model VIIx PDA that is commercially available from Palm, Inc. of Santa Clara, Calif. that has a processor operating at 20 MHz and includes 8 Megabytes of memory.

Additionally, any improvements in the resolution of the handwritten information as a result of creating the new points as well as improvements in the appearance of the handwritten information as a result of smoothing the handwritten information increases the amount of data required to represent the handwritten information. As such, creating the new points and smoothing the handwritten information with the second computing device 14 minimizes the amount of handwritten data that must be stored by the first computing device 12 and/or transmitted by the first computing device to the second computing device. As such, creating the new points and smoothing the handwritten information with the second computing devices further conserves the memory of the first computing device and reduces the bandwidth required in order to transmit the handwritten data from the first computing device to the second computing device since the additional data that would otherwise have been generated by the creation and smoothing processes need not be transmitted.

Either before or after the second computing device 14 has rendered the handwritten information, the second computing device can further process the handwritten information, if desired, such as by employing character recognition techniques to convert the handwritten information into text and/or by employing verification techniques to verify signatures or the like. The second computing device can also store a representation of the handwritten information in a database or the like, such as an image of the handwritten information for incorporation into a message to the intended recipient at some future time, or the second computing device can store the handwritten information for later retrieval, such as, for example, by an Internet client software application. See block 72 of FIG. 3B. Alternatively or in addition, the second computing device can create a message that includes an image of the handwritten information immediately upon rendering the handwritten information. See also block 72. The second computing device can be adapted to create a variety of different types of messages, such as e-mail messages, facsimiles or instant messages. Typically, the type of message depends upon either the directions received by the second computing device from the user of the first computing device 12 or upon prior parameters that have been defined with respect to messages directed to the intended recipient.

In instances in which the handwritten information is to be incorporated into an e-mail message to the intended recipient, the second computing device 14 preferably embeds an image of the handwritten information, such as a .gif image, into the hypertext mark-up language (html) of the e-mail message. For most current e-mail clients operating on the remote devices, such as Lotus Notes or Outlook Express, the image of the handwritten information will appear in the body of the e-mail message itself. However, some remote devices may include older e-mail clients, such as older versions of Lotus Notes, for example, that will place the image of the handwritten information in an attachment to the e-mail message. In some instances, the e-mail client will determine whether the image will appear in the body of the e-mail message or as an attachment. But in other instances, where the second computing device has information about the characteristics of the e-mail client regarding images, the server may decide whether to send the message with the image appearing in the body of the message or as an attachment. While the second computing device can transmit the e-mail message directly to the personal computer 16 or other remote device having an e-mail client of the intended recipient, the second computing device can transmit the e-mail message to an e-mail server 20 for subsequent delivery to the intended recipient, if so desired. In any event, the recipient can open the e-mail message to view the image of the handwritten information. As such, maps, diagrams, drawings or documents including Asian language characters can readily be transmitted via the system 10 and method of the present invention. Such a system is further described in U.S. patent application Ser. No. 09/768,949 entitled *System, Device, Computer Program Product and Method for Representing a Plurality of Electronic Ink Data Points* by Peter Hebert filed concurrently herewith, the contents of which are incorporated herein by preference.

Likewise, an instant message containing an image of the handwritten information can be transmitted from the second computing device to a remote device 22 having instant messaging capability as will be apparent to those skilled in the art. Still further, an image of the handwritten information can be included in the body of a facsimile transmitted by the second computing device to the facsimile machine 18 of the intended recipient. In this regard, a facsimile coversheet, generally identifying the intended recipient as well as the phone and facsimile numbers of the intended recipient and name and phone number of the user transmitting the facsimile, can be defined, either by the user at the time of transmitting the handwritten information or at some prior time. In either instance, the user can define a custom facsimile coversheet tailored to the user or the intended recipient.

In addition to providing the intended recipient with a message that includes the handwritten information, additional data may desirably be related to or associated with the handwritten information. See block 66 of FIG. 3A. For example, this additional data can include additional text, such as one or more standard or predefined paragraphs or the text of an entire letter. Similarly, the additional data can include predefined audio, predefined video, links to web sites, photographs, pictures, or other images, letterhead, stationery or the like. According to one aspect of the present invention, the second computing device 14 can identify the additional data that relates to or is associated with the handwritten information. See block 68. In this regard, the user of the first computing device 12 can provide the second computing device with instructions, either concurrent with the transmission of the handwritten data or at some time prior to the transmission of the handwritten data. These instructions would identify the additional data to be included with the handwritten information. Alternatively, the second computing device or some other component of the system 10 can include prestored instructions indicating the additional data that is to be provided in messages to respective recipients and/or in certain types of messages. For example, the prestored instructions may indicate that all messages to a particular recipient should include a predefined letterhead or background image and should further include additional text that has also been previously stored.

As such, in instances in which the second computing device 14 determines that additional data relates to or is associated with the handwritten information and is to be included in the message transmitted to the intended recipient, the second computing device creates a composite, such as a composite image, message, record or file, including both the handwritten information and the additional data. See block 70 of FIG. 3A. In one embodiment, the second computing device can then create a message that includes the composite with both the image of the handwritten information and the additional data included, albeit separately, within the body of the same message. In some embodiments, however, the handwritten information is desirably superimposed upon the additional data, such as in instances in which the additional data is letterhead, stationery or some other background image. In these embodiments, the processing element 40 of the second computing device can overlay the handwritten information upon the additional data in such a manner that in those locations at which the handwritten information overlaps the additional data, the additional data is to be treated as being transparent such that the handwritten information will appear to be overlaid upon the additional data. The second computing device and, in particular, the processing element can then create a message including the composite for transmission to the intended recipient. By relying upon the second computing device of either embodiment to associate the handwritten information and the additional data, the first computing device 12 need not store the additional data and need not transmit the additional data at or near the time at which the handwritten data is transmitted to the second computing device, if at all, thereby conserving both the memory of the first computing device and the bandwidth required to transmit the handwritten data between the first and second computing devices. In addition, the intended recipient will receive a message that includes both the handwritten information and any additional data that is related to or otherwise associated with the handwritten information such that the intended recipient need not attempt to associate the handwritten information that has been received in one message with any additional data that has been received in other messages.

In one advantageous embodiment, portions of the system 10 and method of the present invention, such as portions of the processing element 40 of the second computing device 14, include a computer program product 48. The computer program product includes a computer-readable storage medium, such as the non-volatile storage medium, and computer-readable program code portions, such as a series of computer instructions, embodied in the computer-readable storage medium for receiving the handwritten data and for subsequently processing and transmitting the handwritten data as described hereinabove. Typically, the computer program is stored by the processing element or a related memory device, such as the non-volatile storage device 44 as depicted in FIG. 1, and is executed by the second computing device upon receipt of handwritten data from the first computing device 12.

In this regard, FIGS. 1, 3A and 3B are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of transmitting and processing handwritten data comprising:
   capturing handwritten information with a first computing device;
   transmitting handwritten data representative of the handwritten information from the first computing device to a second computing device;
   rendering the handwritten information based upon the handwritten data following the transmission of the handwritten data 10 the second computing device;
   identifying additional data to be associated with the handwritten information following the transmission of the handwritten data to the second computing device; and
   creating a composite comprised of both the handwritten information and the additional data.

2. A method according to claim 1 further comprising receiving instructions regarding the additional data to be associated with the handwritten information, wherein the additional data is subsequently identified in accordance with the instructions.

3. A method according to claim 1 wherein identifying additional data comprises identifying additional data selected from the group consisting of predefined text, predefined audio, predefined video, a link to a web site, additional handwritten information, an image and a letterhead.

4. A method according to claim 1 wherein creating the composite comprises separately incorporating both the handwritten information and the additional data into a message.

5. A method according to claim 1 wherein creating the composite comprises overlaying one of the handwritten information and the additional data upon the other.

6. A method according to claim 1 further comprising creating a message that incorporates the composite.

7. A method according to claim 6 wherein creating the message comprises creating a message selected from the group consisting of an e-mail message, a facsimile message and an instant message.

8. A method according to claim 1 further comprising storing the handwritten information and the additional data.

9. A method according to claim 1 wherein the handwritten information comprises a plurality of data points, wherein the method further comprises:
   receiving the handwritten data at the second computing device following transmission of the handwritten data by the first computing device; and
   recovering the handwritten information including the plurality of data points represented by the handwritten data, and
   wherein rendering the handwritten information further comprises drawing lines according to the plurality of data points.

10. A method according to claim 9 wherein rendering the handwriten information further comprises drawing smooth lines according to the plurality of data points.

11. A method according to claim 1, wherein identifying additional data comprises identifying additional, payload data.

12. A system for transmitting and processing handwritten data comprising:
   a first computing device for capturing handwritten information and for transmitting handwritten data representative of the handwritten information; and
   a second computing device for receiving the handwritten data transmitted by said first computing device, said second computing device comprising a processing element for rendering the handwritten information based upon the handwritten data, wherein said processing element is also adapted to identify additional data to be associated with the handwritten information and to create a composite comprised of both the handwritten information and the additional data.

13. A system according to claim 12 wherein said processing element is also adapted to receive instructions regarding the additional data to be associated with the handwritten information such that the additional data is subsequently identified in accordance with the instructions.

14. A system according to claim 12 wherein said processing element identifies additional data selected from the group consisting of predefined text, predefined audio, predefined video, a link to a web site, additional handwritten information, an image and a letterhead.

15. A system according to claim 12 wherein said processing element is adapted to separately incorporate both the handwritten information and the additional data into a message in order to create the composite.

16. A system according to claim 12 wherein said processing element is adapted to overlay one of the handwritten information and the additional data upon the other in order to create the composite.

17. A system according to claim 12 wherein said processing element is also adapted to create a message that incorporates the composite.

18. A system according to claim 17 wherein said processing element creates a message selected from the group consisting of an e-mail message, a facsimile message and an instant message.

19. A system according to claim 12, wherein said second computing device further comprises a memory device for storing the handwritten information and the additional data.

20. A system according to claim 12 wherein the handwritten information comprises a plurality of data points, wherein said processing element is also adapted to recover the handwritten information including the plurality of data points represented by the handwritten data, and wherein said processing element is further adapted to draw lines according to the plurality of data points in order to render the handwritten information.

21. A system according to claim 20 wherein said processing element is further adapted to draw smooth lines according to the plurality of data points.

22. A system according to claim 12, wherein the second computing device is adapted to identify additional, payload data.

23. A computer program product for processing handwritten data, the computer program product comprising a computer-readable storage medium having computer readable program code portions stored therein, the computer-readable program code portions comprising:
   a first executable portion for receiving handwritten data that has been transmitted by a remote computing device;
   a second executable portion for rendering the handwritten information based upon the handwritten data;
   a third executable portion for identifying additional data to be associated with the handwritten information; and
   a fourth executable portion for creating a composite comprised of both the handwritten information and the additional data.

24. A computer program product according to claim 23 wherein said third executable portion is adapted to identify additional data selected from the group consisting of predefined text, predefined audio, predefined video, a link to a web site, additional handwritten information, an image and a letterhead.

25. A computer program product according to claim 23 wherein said fourth executable portion is adapted to separately incorporate both the handwritten information and the additional data into a message in order to create the composite.

26. A computer program product according to claim 23 wherein said fourth executable portion is adapted to overlay one of the handwritten information and the additional data upon the other in order to create the composite.

27. A computer program product according to claim 23 further comprising a fifth executable portion for creating a message that incorporates the composite.

28. A computer program product according to claim 27 wherein said fifth executable portion is adapted to create a message selected from the group consisting of an e-mail message, a facsimile message and an instant message.

29. A computer program product according to claim 23 wherein the handwritten information comprises a plurality of data points, wherein the computer-readable program code portions ether comprise a sixth executable portion for recovering the handwritten information including the plurality of data points represented by the handwritten data, and wherein said second executable portion is also adapted to draw lines according to the plurality of data points.

30. A computer program product according to claim 29 wherein said second executable portion is further adapted to smooth the lines according to the plurality of data points.

31. A computer program product according to claim 23 further comprising a fifth executable portion for storing the composite.

32. A computer program product according to claim 23 wherein the third executable portion is adapted to identify additional, payload data.

* * * * *